(12) United States Patent
Yamaguchi

(10) Patent No.: US 11,915,480 B2
(45) Date of Patent: Feb. 27, 2024

(54) IMAGE PROCESSING APPARATUS AND IMAGE PROCESSING METHOD

(71) Applicant: CANON KABUSHIKI KAISHA, Tokyo (JP)

(72) Inventor: Shota Yamaguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 272 days.

(21) Appl. No.: 17/351,525

(22) Filed: Jun. 18, 2021

(65) Prior Publication Data
US 2021/0397881 A1 Dec. 23, 2021

(30) Foreign Application Priority Data
Jun. 23, 2020 (JP) ................. 2020-107624

(51) Int. Cl.
*G06V 20/30* (2022.01)
*G06F 18/22* (2023.01)
*G06F 18/2413* (2023.01)

(52) U.S. Cl.
CPC .............. *G06V 20/30* (2022.01); *G06F 18/22* (2023.01); *G06F 18/2413* (2023.01)

(58) Field of Classification Search
CPC ...... G06V 20/30; G06F 18/22; G06F 18/2413
See application file for complete search history.

(56) References Cited

U.S. PATENT DOCUMENTS

| | | | | |
|---|---|---|---|---|
| 2005/0120055 A1* | 6/2005 | Kawaguchi | ............. | G06F 16/51 707/E17.031 |
| 2014/0099026 A1* | 4/2014 | Krishnaswamy | .... | H04N 1/6086 382/167 |
| 2018/0164984 A1* | 6/2018 | Kunieda | ............. | G06F 3/04845 |
| 2020/0090369 A1* | 3/2020 | Yamaji | ................... | G06V 20/30 |
| 2020/0110516 A1* | 4/2020 | Ooba | ................... | G06F 16/538 |
| 2021/0397881 A1* | 12/2021 | Yamaguchi | ............. | G06V 20/30 |

FOREIGN PATENT DOCUMENTS

| | | | |
|---|---|---|---|
| JP | 2003-058867 A | | 2/2003 |
| JP | 2003058867 A | * | 2/2003 |

* cited by examiner

*Primary Examiner* — Md K Talukder
(74) *Attorney, Agent, or Firm* — Cowan, Liebowitz & Latman, P.C.

(57) ABSTRACT

An image processing apparatus includes: a receiving unit configured to receive registration of a new image group for at least one existing image group; and a generation unit configured to specify an image having consistency with representative images, which are set for the existing image groups respectively, out of the images included in the new image group, and generate from the specified image a representative image of the new image group.

15 Claims, 15 Drawing Sheets

| [ATTRIBUTE TYPE] | [CONSISTENCY INFORMATION] |
|---|---|
| SUBJECT CATEGORY | food |
| COMPOSITION | CENTER/N × M PIXEL |
| TINGE | NO CONSISTENCY |
| GRADATION | NO CONSISTENCY |
| FILTER | CHROME ENHANCEMENT |

| [ATTRIBUTE TYPE] | [CONSISTENCY INFORMATION] | [WEIGHT] |
|---|---|---|
| SUBJECT CATEGORY | food | W[1] |
| COMPOSITION | CENTER/N × M PIXEL | W[2] |
| TINGE | NO CONSISTENCY | W[3] |
| GRADATION | NO CONSISTENCY | W[4] |
| FILTER | CHROMA ENHANCEMENT | W[5] |

FIG. 9

| [ATTRIBUTE TYPE] | 0 ---------- [SIMILARITY DEGREE] ---------- 1 | | |
|---|---|---|---|
| SUBJECT CATEGORY | MISMATCH | | MATCH |
| COMPOSITION | LARGE --- | (SUBJECT SIZE DIFFERENCE) + (SUBJECT POSITION DIFFERENCE) | --- SMALL |
| TINGE | LARGE --- | (MAIN COLOR DIFFERENCE) | --- SMALL |
| GRADATION | MISMATCH | | MATCH |
| FILTER | MISMATCH | | MATCH |

BEFORE PROCESSING    AFTER PROCESSING

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

In a case of creating a set of images (e.g., album) by extracting a plurality of images from a large number of captured images, a representative image of the extracted image group is determined, and, for this, techniques to determine the representative image have been disclosed. For example, Japanese Patent Application Publication No. 2003-058867 discloses a method of selecting a representative image by determining, for each time period, an image capturing frequency and resolution of image data in the album.

In recent years, in video sharing apps using a smartphone or the like, a plurality of images can be posted as an album (image group), and the posted album is displayed as a thumbnail of a representative image selected from the images in the album. In a case where a plurality of albums are posted, it is preferable that a wall, on which a thumbnail of a representative image of each album is list-displayed, has consistency.

In a case of automatically generating a plurality of albums using a photo management app as well, it is preferable that a wall, on which the representative images of the plurality of albums are list-displayed, has consistency. However, if a representative image is selected based only on the image capturing frequency and resolution of the image data within the same album, the selected representative image may note relate to the representative images of other existing albums, and the wall in this case may not provide consistency.

SUMMARY OF THE INVENTION

The present invention provides a technique of providing consistency when a plurality of image groups are list-displayed using respective representative images.

An image processing apparatus of the present invention includes: a receiving unit configured to receive registration of a new image group for at least one existing image group; and a generation unit configured to specify an image having consistency with representative images, which are set for the existing image groups respectively, out of the images included in the new image group, and generate from the specified image a representative image of the new image group.

Further features of the present invention will become apparent from the following description of exemplary embodiments with reference to the attached drawings.

BRIEF DESCRIPTION OF THE DRAWINGS

FIG. 9 is a table indicating an example of calculating a similarity degree of the attribute information;

DESCRIPTION OF THE EMBODIMENTS

Preferred embodiments of the present invention will be described with reference to the drawings. The present invention is not limited to the following embodiments, but may be changed as required within a scope of not departing from the essence thereof.

Embodiment 1

Embodiment 1 is an example of generating a representative image of an image group that is newly posted on a wall based on consistency. The image group is also referred to as an album. The wall is a list-display of thumbnails of representative images of existing albums. An image included in an album may be a still image or a moving image constituted of a plurality of frames.

Figure 1:
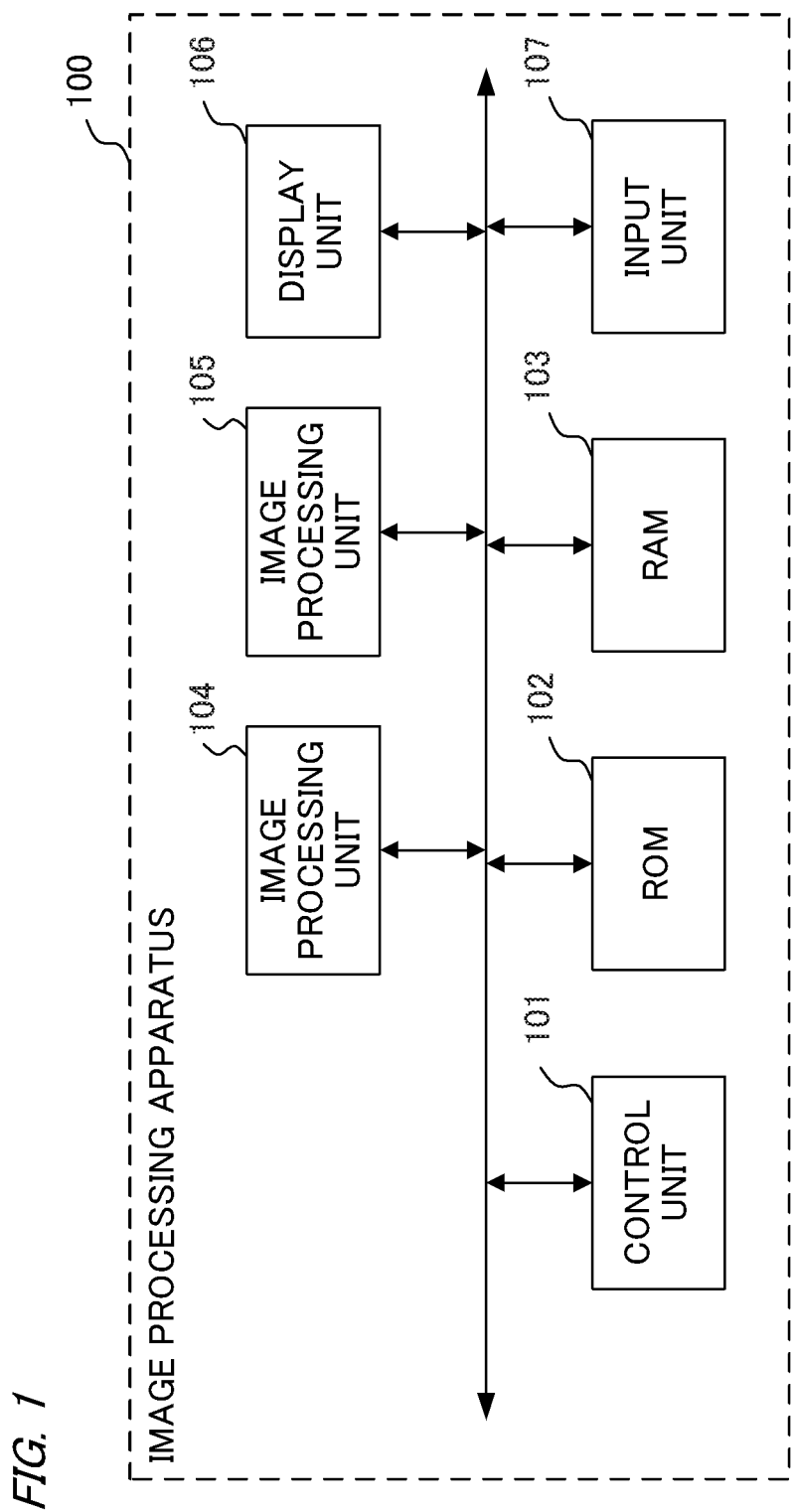
FIG. 1 is a block diagram depicting a configuration example of an image processing apparatus.

Apparatus Configuration: A configuration example of an image processing apparatus 100 will be described with reference to FIG. 1. FIG. 1 is a block diagram depicting a configuration example of the image processing apparatus 100. The image processing apparatus 100 is an edge terminal used for edge computing, and may be such a general purpose computer as a personal computer (PC), a tablet terminal and a smartphone. The image processing apparatus 100 includes a control unit 101, a ROM 102, a RAM 103, an image processing unit 104, a recording unit 105, a display unit 106 and an input unit 107.

The control unit 101 is a processor, such as a CPU or DSP, for example. The control unit 101 reads a control program for each block of the image processing apparatus 100, from the ROM 102, develops the control program in the RAM 103, and executes the control program. Thereby the control unit 101 can control the operation of each block of the image processing apparatus 100.

The ROM 102 is an electrically erasable and recordable non-volatile memory. The ROM 102 stores operation programs of each block of the image processing apparatus 100, and parameters and the like used for operation of each block. The RAM 103 is a rewritable volatile memory, and is used for developing programs executed by the control unit 101 and the like, and for temporarily storing data generated during operation of each block of the image processing apparatus 100, for example.

The image processing unit 104 applies various types of image processing, such as various types of filter processing (e.g. chroma enhancement), on the image data stored in the RAM 103. The recording unit 105 is a removable memory card, for example, and stores image data and the like. The display unit 106 is a display device, such as an LCD. The display unit 106 displays the images recorded in the recording unit 105 and are temporarily stored in the RAM 103, the user interface to receive instructions (operations) from the user, and the like. The input unit 107 is a touch panel, mouse, or the like, and receives input of an instruction via user operation.

Figure 2:
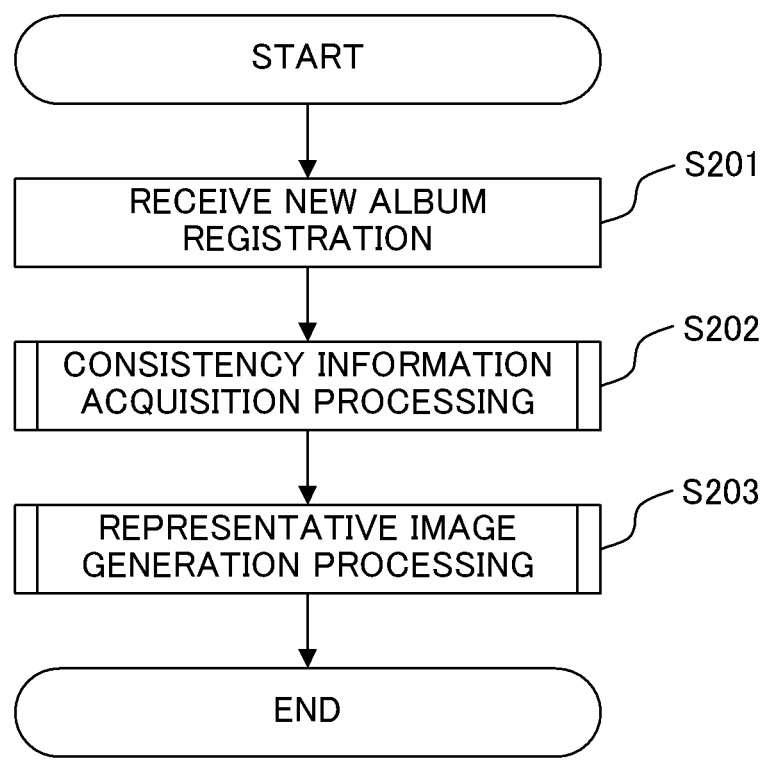
FIG. 2 is a flow chart exemplifying registration processing of a new album.

New Album Registration Processing: FIG. 2 is a flow chart exemplifying new album registration processing. The new album registration processing is processing to receive registration of a new album (new image group) generated by grouping one or more images, and generate a representative image of the new album based on consistency information acquired from the wall. The representative image of the registered new album is displayed on the wall along with the representative images of the existing albums.

The new album registration processing includes step S201 of receiving registration of a new album, step S202 of acquiring the consistency information of the wall, and step S203 of generating a representative image of the new album. The consistency information is information on the attribute information by which the wall is unified, or information indicating that the wall has no consistency, and the consistency information is indicated for each type of attribute information (hereafter also referred to as "attribute type") of the representative image of the existing album. The "attribute information of an image" refers to information indicating the attribute of this image, such as information on the attribute of the image, regarding one or a plurality of aspects (attribute types). Examples of the attribute types are the subject category, composition, tinge, gradation and filter.

S201: Receiving Registration of New Album: In step S201, the control unit 101 receives registration of a new album. For example, the new album is an image group that includes one or more images which the user arbitrarily selected from the existing captured images. The image group is uploaded to an image posting app as an album, or stored in an image management app, for example. The album is not limited to an image group which the user arbitrarily selected, but may be generated from an image group which photo management app automatically selected and was recommended to the user. In the following description, it is assumed that the new album is generated by a smartphone which is used as the image processing apparatus 100.

S202: Consistency Information Acquisition Processing: In step S202, the control unit 101 acquires the consistency information on the wall. The consistency information is information on the attribute information by which the wall is unified, or information indicating that the wall has no consistency, and the consistency information is indicated for each attribute type of the representative images of the existing albums. The attribute information is information used to determine the consistency among the representative images displayed on the wall. Here the consistency information acquisition processing in step S202 will be described with reference to FIGS. 3A and 3B to 5A and 5B.

Figure 3A:
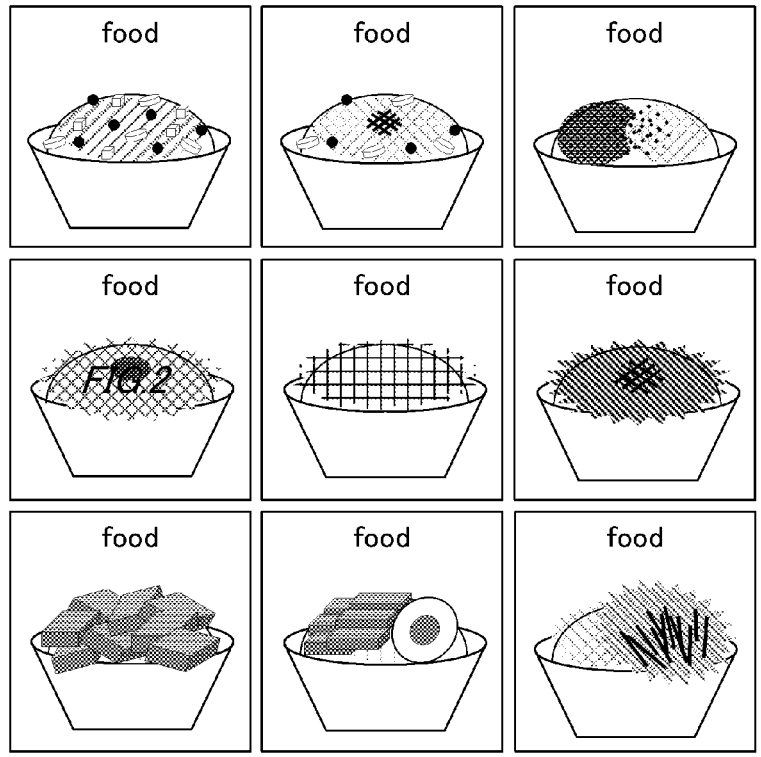
FIGS. 3A and 3B are diagrams exemplifying a wall having consistency and a wall not having consistency.
Figure 3B:
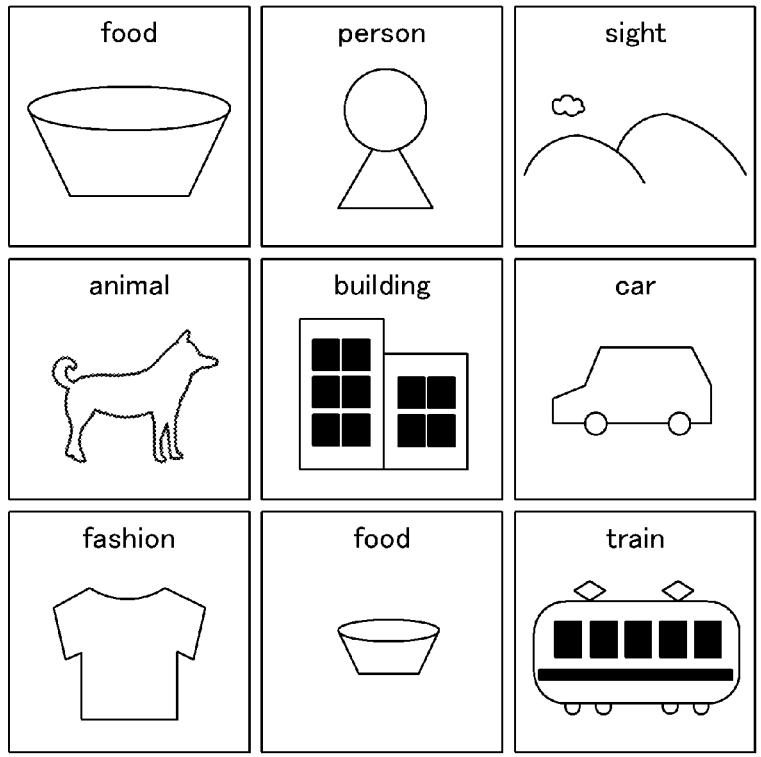

FIGS. 3A and 3B are diagrams for describing whether or not the wall has consistency. The wall is a list-display of representative images of albums stored in the image processing apparatus 100. FIG. 3A is an example of a wall having consistency. In FIG. 3A, the representative images of the albums displayed on the wall are unified, since the category (type) of the subject is all food. The subject size of each representative image is also generally unified. In this way, the wall indicated in FIG. 3A has consistency at first sight, and is generally regarded as desirable.

FIG. 3B is an example of a wall not having consistency. In FIG. 3B, the representative images of the albums displayed on the wall include images of which the category of the subject is a food, a person, a sight, or the like. In other words, the subject matter of the wall is not clear, and the albums displayed on the wall are not unified. Furthermore, the wall in FIG. 3B includes two images of which the category of the subject is food, but the sizes of these subjects are different from each other, and do not have consistency. In this way, the wall indicated in FIG. 3B does not have consistency, and is therefore regarded as undesirable.

In order to automatically acquire a wall having consistency as exemplified in FIG. 3A, the image processing apparatus 100 acquires the attribute information from the representative images of the existing albums displayed on the wall, and specifies an image having consistency with the wall from the new album, based on the acquired attribute information. The attribute information to determine the consistency is not limited to the category and size of the subject, but may be information on other elements (attributes). For example, the attribute information may be such information as the tinge or gradation of the image in general, the angle or position of the subject, and the like.

The image processing apparatus 100 determines the specified image as the representative image of the new album, and displays this representative image on the wall along with the representative images of the existing albums. The representative image of the new album may be the exact image specified as the representative image having consistency, or may be a processed image of this specified image. The processing of the image includes not only cropping and filtering processing, but also the generation of a thumbnail image.

Figure 4:
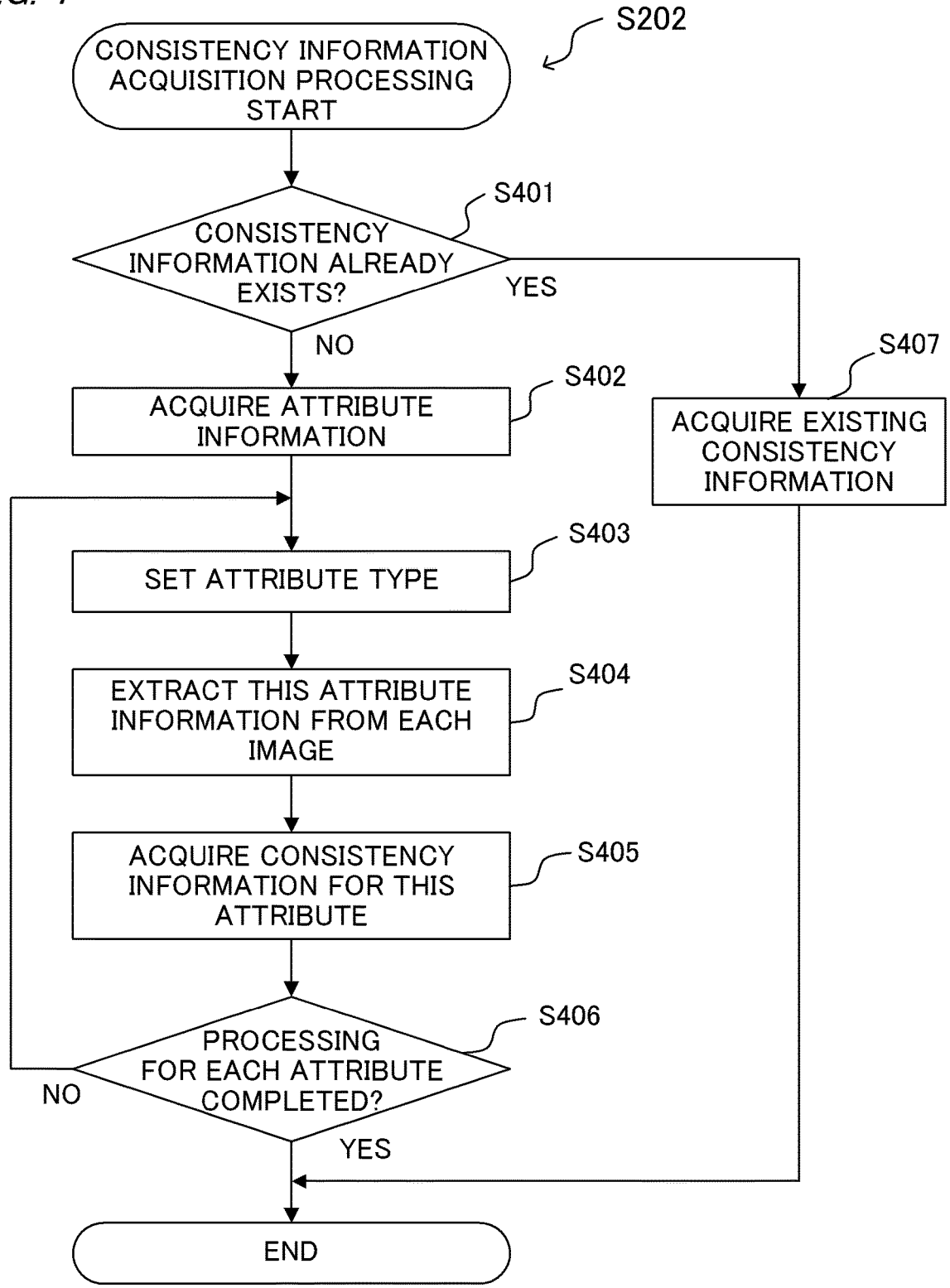
FIG. 4 is a flow chart exemplifying consistency information acquisition processing according to Embodiment 1.

FIG. 4 is a flow chart exemplifying the consistency information acquisition processing in step S202 according to Embodiment 1. In step S401, it is determined whether the consistency information on the wall already exists. The wall is a set of representative images of the existing albums. The consistency information is information that indicates the coherency for each element (attribute type) of the representative images of the existing albums included on the wall. Although specifics will be described later, the consistency information can be acquired from the attribute information on the representative image of the album included on the wall. If there are a plurality of albums on the wall, the consistency information on the wall may be an average value of the attribute information extracted from each album. The consistency information on the wall may be a value that is shared by most albums among the albums on the wall.

The attribute information extracted from each existing album and the consistency information on the wall acquired from the attribute information are recorded and held on a server or recording medium of the image processing apparatus 100. In this case, the control unit 101 determines that the consistency information on the wall already exists. On the other hand, the consistency information does not exist for a wall on which the album generation processing has been performed by manually selecting or generating the representative images of the albums.

If it is determined that the consistency information on the wall already exists (step S401: YES), processing advances to S407. If it is determined that the consistency information on the wall does not exist (step S401: NO), processing advances to step S402.

In step S402, the control unit 101 acquires the attribute information from the representative images of the existing albums included on the wall. The attribute information includes such information as the subject category, composition, tinge, gradation and filter information. From the acquired attribute information, the control unit 101 extracts the attribute information of each album included on the wall for each attribute type in steps S403 and S404. In step S405, the control unit 101 determines whether there is consistency among the albums for each attribute type.

In step S403, the control unit 101 sets an attribute type to acquire the consistency information on the wall. The attribute types include various attributes to determine the consistency of the wall, such as the subject category, composition, tinge, gradation and filter information. The subject category of subject is, for example, a food, a person, a sight, an animal, or the like. The composition is information on the composition, such as the position and the size of the subject. The tinge is information on specific major colors and the like which the image has in general. The gradation is information on the gradation, such as the tone curve, HDR/SDR, and the like. The filter information is information on the filter (e.g. chroma enhancement) performed on the image.

In step S404, the control unit 101 extracts the attribute information of the attribute type, which was set in step S403, from the representative image of each existing album on the wall. For example, in the case where the attribute type was set to the subject category in step S403, the control unit 101 detects a main subject from each representative image by known subject detection processing. As the attribute information, the control unit 101 extracts the category to which the detected main subject belongs.

In step S405, the control unit 101 acquires the consistency information on the wall, for the attribute type which was set in step S403. Specifically, based on the attribute information on each representative image extracted in step S404, the control unit 101 determines whether there is consistency among the existing albums on the wall. If there is consistency for the attribute type, the control unit 101 sets the attribute information, which was most frequently extracted from each representative image, as the consistency information on the wall, and records this setting in the recording unit 105. If there is no consistency for the attribute type, the control unit 101 sets "No consistency" in the consistency information, and records this setting in the recording unit 105.

For example, if it is determined that the subject category is food in at least a predetermined ratio of images among the representative images on the wall, the control unit 101 determines that there is consistency for the subject category, and sets "food" as the consistency information for the subject category on the wall. On the other hand, if the subject category is not the same in at least a predetermined ratio of images among the representative images on the wall, the control unit 101 determines that there is no consistency on the wall for the subject category, and records "No consistency" in the recording unit 105.

In step S406, the control unit 101 determines whether the processing steps from S403 to S405 were executed for the predetermined attribute types. If the processing from step S403 to step S405 was not completed for each attribute (attribute type) (step S406: NO), processing returns to step S403. If the processing from step S403 to step S405 was completed for each attribute (step S406: YES), the consistency information acquisition processing in FIG. 4 ends.

In step S407, the consistency information on the wall already exists, hence the control unit 101 acquires the existing consistency information from the recording unit 105, and ends the consistency information acquisition processing.

Figures 5A, 5B:
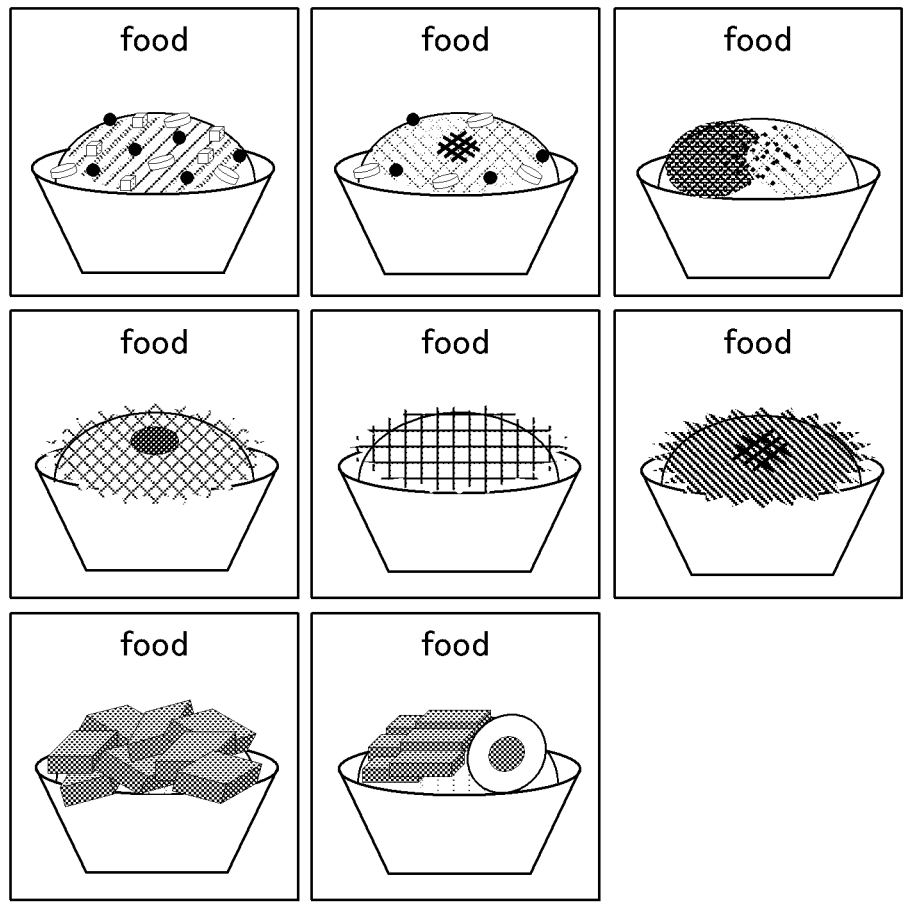
FIGS. 5A and 5B are a diagram and a table for describing consistency information on the wall.

The consistency information on the wall will be described with reference to FIGS. 5A and 5B. FIG. 5A is an example of an existing wall. FIG. 5B is an example of the consistency information acquired from the wall in FIG. 5A by the consistency information acquisition processing in FIG. 4. The consistency information on the wall is set based on the attribute information of the representative images of the existing albums included on the wall. In other words, for the consistency information on the wall, the attribute information having consistency extracted from each representative image is set.

In the case of the example in FIG. 5B, the subject category on the wall is unified as food. In other words, it is determined that at least the predetermined ratio of images, among the representative images included on the wall, are food regarding the subject category.

It is also determined that the composition of each image on the wall is unified since a subject exists at the center and the size of the subject is N–M pixels. In other words, at least a predetermined ratio of images, among the representative images included on the wall, are images where the subject exists at the center and the size of the subject is N×M pixels. "The subject exists at the center" may be referred to as "the distance of the center coordinates of a rectangle surrounding the subject from the center of the representative image is within a predetermined threshold", for example. "The size of the subject is N×M pixels" may include a case where "the difference of the size of the rectangle surrounding the subject from the N×M pixels is within a predetermined threshold". The predetermined threshold may be 5% both vertically and horizontally, for example.

The tinge and gradation of the images on the wall are determined as "No consistency". The filter used on the images on the wall is determined as having consistent with a "chroma enhancement" filter. In other words, at least a predetermined ratio of images, among the representative images included on the wall, are processed using the chroma enhancement filter.

S203: Representative Image Generation Processing. In step S203 in FIG. 2, the control unit 101 generates a representative image of the new album to be registered. First, from a plurality of images included in the new album, the control unit 101 specifies an image having consistency with the representative images of the existing albums displayed on the wall. Based on the specified image, the control unit 101 generates a representative image of the new album. The control unit 101 may use the specified image itself as the representative image of the new album, or may generate the representative image of the new album by processing the specified image. Here the representative image generation processing in step S203 will be described with reference to FIGS. 6 to 10A, 10B, and 11.

Figure 6:
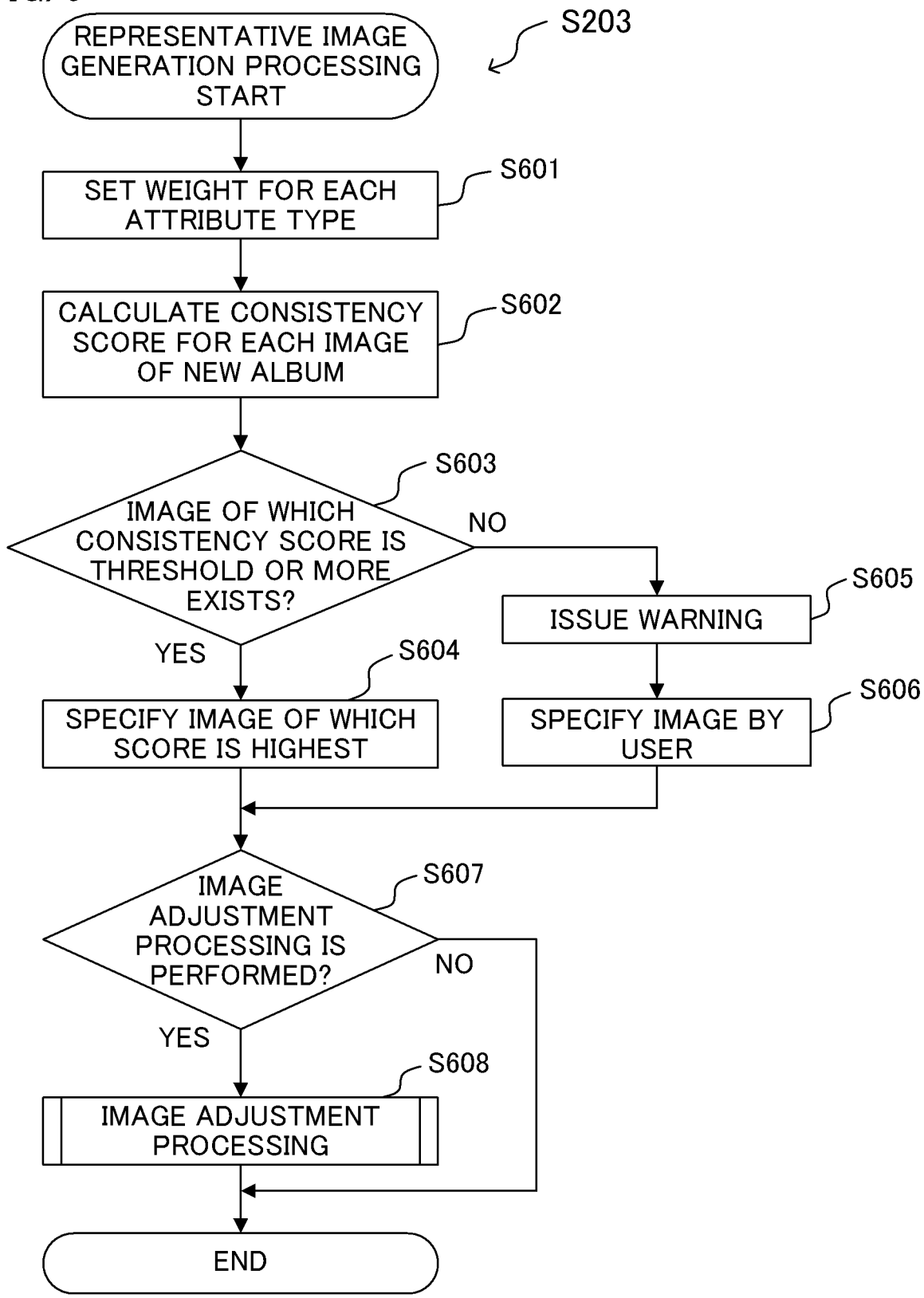
FIG. 6 is a flow chart exemplifying representative image generation processing.

FIG. 6 is a flow chart exemplifying the representative image generation processing. In step S601, the control unit 101 sets a weight for each attribute type. The weight is set in accordance with the priority of the attribute type when the consistency on the wall is determined.

Figures 7, 8:
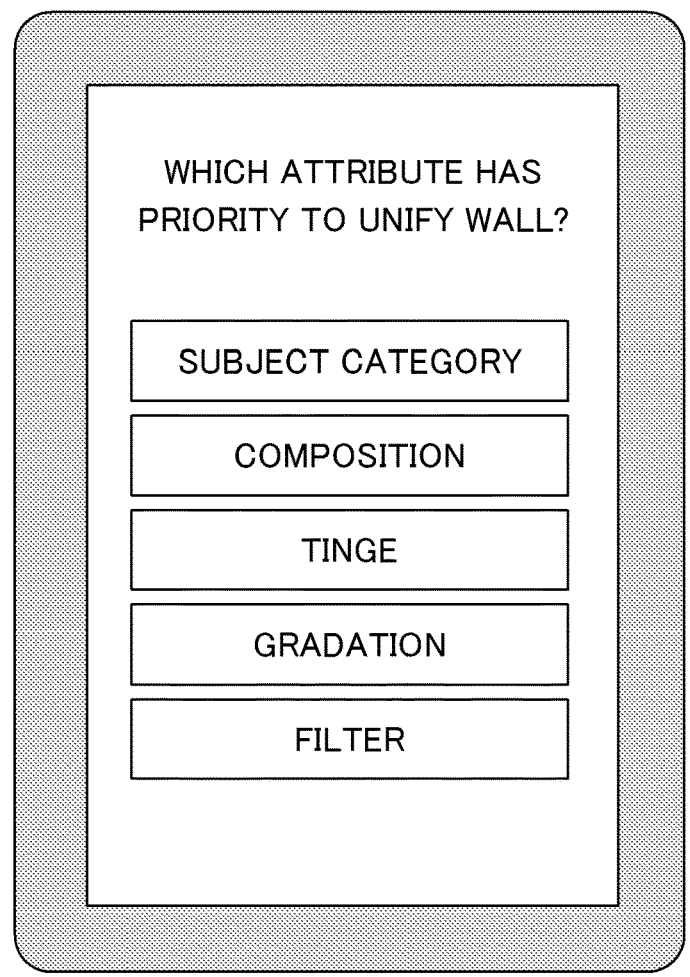
FIG. 7 is a table exemplifying setting of a weight for each attribute type.
FIG. 8 is a diagram exemplifying an interface to specify a weight for each attribute type.

FIG. 7 is a table exemplifying the setting of weights for each attribute type. In the case of the example in FIG. 7, the weights for the attribute type ("subject category" to "filter") are W[k] (k=1 to 5) respectively. The information on the weight for each attribute type is held in the image processing apparatus 100 (server or edge terminal) or the like. The weight W[k] which is set for each attribute type may be a predetermined value, or a value which the user set via the input unit 107 of the image processing apparatus 100.

FIG. 8 is a diagram exemplifying an interface to specify the weight for each attribute type. In the case of the example in FIG. 8, the user selects one of the attribute types displayed on the screen. The control unit 101 sets such that the weight of the attribute type selected by the user is larger than the weights of the other attribute types. The interface for the user to specify the weight for each attribute type is not limited to the example in FIG. 8, and may allow the user to specify a priority sequence of each attribute type. In this case, the control unit 101 sets a weight for each attribute in accordance with the specified priority sequence.

Specification of the weight for each attribute type is not limited to the specification by the user via the interface indicated in FIG. 8, but may be performed by a different method. For example, the control unit 101 may set a weight for each attribute type based on the result of learning the image capturing history of the user. Specifically, the control unit 101 may set a weight in accordance with the value of the consistency by analyzing the images captured by the user and digitizing the consistency for each attribute type.

In step S602, the control unit 101 calculates a score that indicates the consistency with the images on the wall (hereafter referred to as "consistency score") for each image included in the new album. The consistency score S[i] of the i-th image in the new album is calculated by the following Expression (1), for example.

[Math. 1]

$$S[i] = \sum W[k] \times [i, k] \qquad \text{Expression (1)}$$

In Expression (1), W[k] indicates the weight of the attribute type k which was set in step S601. X[i,k] indicates the similarity degree between the attribute information of the i-th image in the new album and the consistency information on the wall, for the attribute type k. The summation symbol (sigma) indicates determining the sum for the predetermined attribute type k.

Here a method of calculating the similarity degree X[i,k] will be described with reference to FIG. 9. FIG. 9 is a table indicating an example of calculating the similarity degree of the attribute information. The similarity degree is standardized in a range of 0 to 1, and the similarity degree is higher as the value is closer to 1. The similarity degree is calculated for each attribute type by comparing the attribute information of the i-th image in the new album with the consistency information on the wall acquired in the consistency information acquisition processing in FIG. 4. The similarity degree for an attribute type which was set as "No consistency" on the wall may be calculated by comparing with the attribute information of a representative image of each existing album that is displayed around a position where the new album is inserted. The similarity degree for each attribute type may be calculated by comparing with the attribute information on a representative image of each existing album that is displayed around the position where the new album is inserted, without using the consistency information on the wall.

As indicated in FIG. 9, the similarity degree for the subject category is set to 0 or 1, depending on whether the subject category of the i-th image matches or mismatches with the subject category of the images on the wall. The similarity degree for the composition is calculated in a range from 0 to 1, depending on the difference of the size and position of the main subject in the i-th image from the size and position of the main subject in the images on the wall. The similarity degree of the composition becomes closer to 1 as the difference of the size and position of the main subject from those on the wall is smaller.

In the same way, the similarity degree for the tinge is calculated in a range from 0 to 1, depending on the difference of the tinge of the major color (main color) of the i-th image from the main color of the images on the wall. The similarity of the tinge becomes closer to 1 as the difference of the tinge of the main color from that on the wall is smaller. The similarity degree for the gradation is set to 0 or 1 depending on whether the gradation of the i-th image is an HDR image or an SDR image, and whether this information matches or mismatches with that on the wall. The similarity degree for the filter is set to 0 or 1 depending on whether information on the prefilter used for image processing matches or mismatches with the images on the wall.

The above mentioned indices used for calculating the similarity degrees are merely examples, and other indices in according with the attribute type may be used. The consistency score S[i] is calculated by Expression (1) using the calculated similarity degree X[i,k] and the weight W[k] that was set.

The consistency score S[i] is not limited to calculation based on the similarity degree acquired by comparing the attribute information on the i-th image in the new album and the consistency information on the wall. The consistency score S[i] may be calculated based on the similarity degree acquired by comparing the attribute information on the i-th image in the new album and the attribute information on a representative image of each existing album. For example, the similarity degree for each attribute type may be calculated by evaluating the similarity degree between the i-th image in the new album and the representative image of each existing album for this attribute type, and determining a number of representative images of which similarity degree is at least a threshold. The consistency score S[i] of the i-th image in the new album may be calculated as an average of the similarity degree of each attribute type. Further, the similarity degree for each attribute type is not limited to calculation based on a number of representative images of which similarity degree is at least a threshold, but may be calculated based on the matching degree between the attribute information on the i-th image and the attribute information on the representative image of each existing album.

In step S603, the control unit 101 determines whether there is an image of which the consistency score S[i] is at least a predetermined threshold among the images in the new album. The predetermined threshold may be set, for example, to 80% of the maximum value possible of the consistency score S[i].

If there is an image of which the consistency score S[i] is at least the predetermined threshold (step S603: YES), processing advances to step S604. If there is no image of which the consistency score S[i] is at least the predetermined threshold (step S603: NO), processing advances to S605.

In step S604, the control unit 101 specifies an image of which consistency score S[i] is highest among the images in the new album, as an image that is more consistent with the images on the wall.

In step S605, the control unit 101 issues a warning to the user that it is difficult to generate a sufficiently consistent wall if an image in the currently registered new album is added to the wall.

In step S606, the control unit 101 specifies the image, which the user specified among the images in the new album, as an image used for generating the representative image. For example, the control unit 101 can specify the image used for generating the representative image by list-displaying the images in the new album on the image processing apparatus 100, and receiving the specification of an image by touch operation of the user.

In step S607, the control unit 101 determines whether the image adjustment processing is performed on the specified representative image. The determination whether or not the image adjustment processing is performed may be predetermined, or may be instructed by the user each time a new album is added. If the image adjustment processing is performed (step S607: YES), processing advances to step S608, and if the image adjustment processing is not performed (step S608: NO), the representative image generation processing in FIG. 6 ends. Here "image adjustment processing" refers to image processing that is performed on the representative image, so as to become even more consistent with the images on the wall.

Figure 10A:
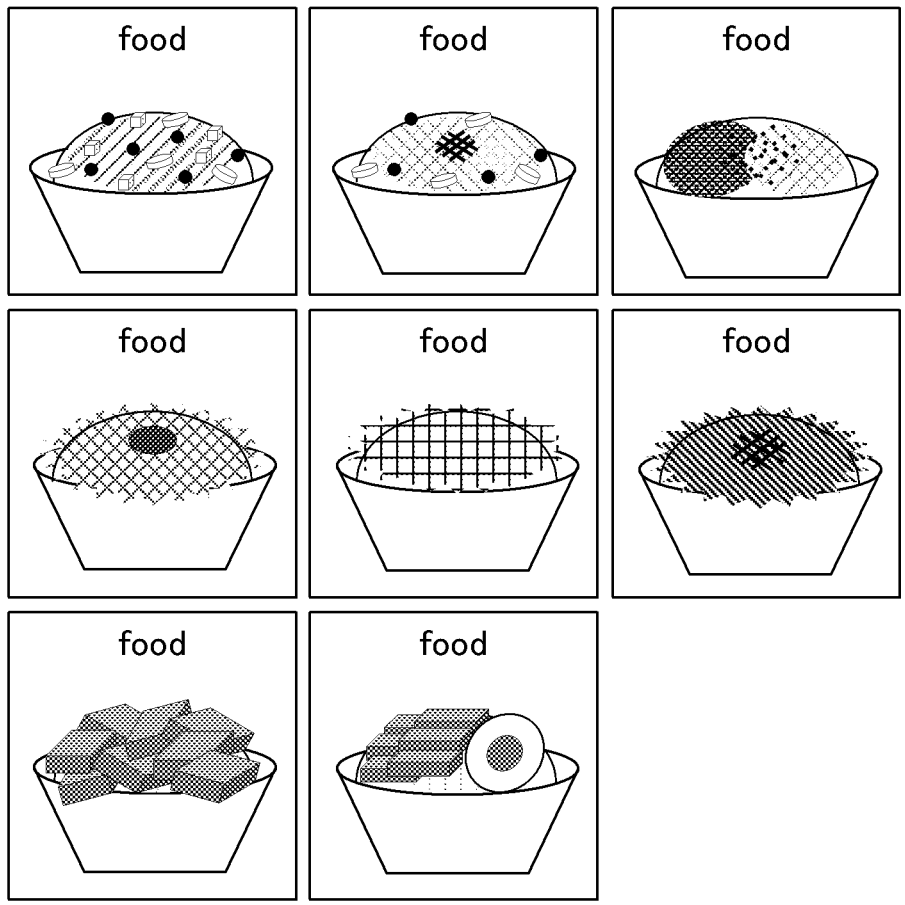
FIGS. 10A and 10B are diagrams indicating an example of image adjustment processing.
Figure 10B:
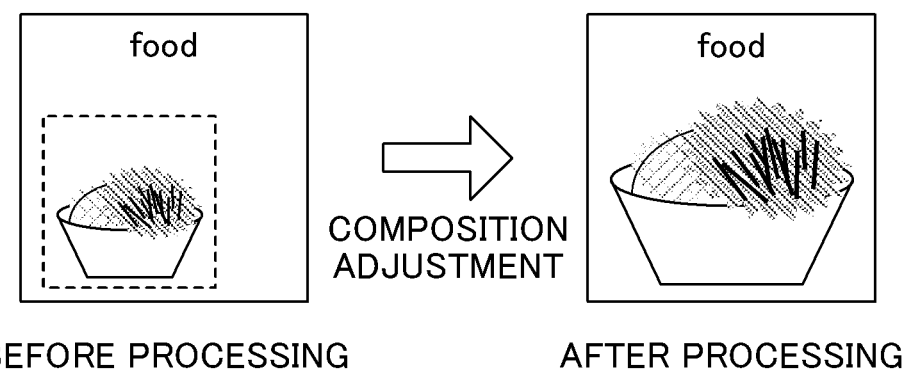

FIGS. 10A and 10B are diagrams indicating an example of the image adjustment processing performed on a representative image. FIG. 10A exemplifies the wall constituted of existing albums, which is the same as FIG. 5A. FIG. 10B indicates images before and after the image adjustment processing for a representative image specified in step S604 or step S606. In the representative image before processing, the subject category is food, which is the same as the subject category of the wall, but the position of the subject is not at the center and the size is smaller than each subject on the wall. Therefore if this representative image before processing is included on the wall, the generated wall may not have sufficient consistency.

Hence the control unit 101 crops a portion surrounded by a rectangle where the subject is at the center, from the representative image before processing, and magnifies the portion, as indicated in the image after processing in FIG. 10B. In other words, the representative image is generated by cropping and magnifying the image so that the main subject portion comes to the center in the same manner as the representative images of the other existing albums. In this way, in order to present consistency for the composition, the positions or sizes of the subjects are unified. In order to present consistency for the other attribute types, processing is performed such that values unique to each attribute type (e.g. HDR or SDR in the case of gradation, value of RGB in the case of tinge, filter used in the case of filter) are unified. The processing to be performed for each attribute type may be set in advance.

The processing of cropping and magnifying a part of the image to adjust the composition is an example of the image adjustment processing. By performing the image adjustment processing on an image specified as an image having consistency with the representative images of the existing albums, the control unit 101 can generate a representative image that has higher level of consistency with the images on the wall.

The image adjustment processing is not limited to the adjustment processing for the composition, but may be a processing to perform tinge adjustment, gradation adjustment, filter processing or the like on a specified image in accordance with the attribute type exemplified in FIG. 5B, so as to generate a representative image of the new album. The image adjustment processing for the tinge is, for example, processing to make correction so that the similarity degree between the main color of the representative image and the main color of each image on the wall becomes a predetermined threshold or more. The image adjustment processing for the gradation is, for example processing to match HDR/SDR of the representative image with that of each image on the wall, or to match the tone curves thereof. The image adjustment processing for the filter is, for example, processing to perform the filter processing which was performed on the representative images of the existing albums included on the wall.

Figure 11:
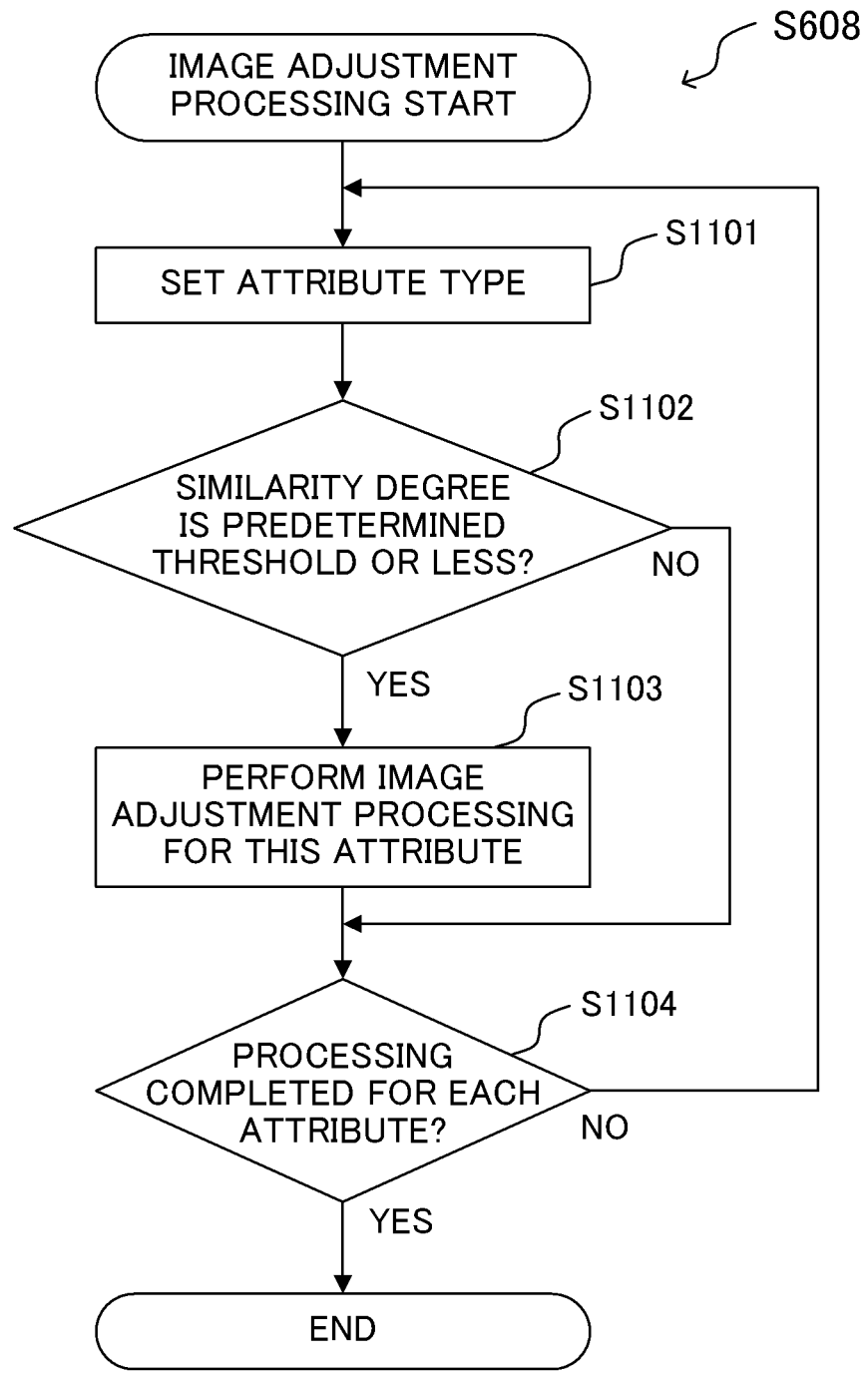
FIG. 11 is a flow chart exemplifying the image adjustment processing.

In step S608, the image adjustment processing is performed on the image specified in step S604 or step S606. Here the image adjustment processing will be described with reference to FIG. 11. FIG. 11 is a flow chart exemplifying the image adjustment processing.

In step S1101, the control unit 101 sets the attribute type for which the adjustment is performed. For example, the control unit 101 sequentially sets the attribute types indicated in FIG. 5B, and performs the image adjustment processing corresponding to the attribute type that is set in step S1102 and S1103. The control unit 101 may omit adjustment for the attribute type for which image adjustment processing is difficult, such as adjustment of the subject category.

In step S1102, for the attribute type that was set in step S1101, the control unit 101 determines whether the similarity degree $X[i,k]$ between the attribute information of the image specified in the step S604 or step S606 and the consistency information on the wall is a predetermined threshold or less. The predetermined threshold is 70%, for example. The predetermined threshold may be set in accordance with the weight for the attribute type which was set in step S601. In other words, if the predetermined threshold is set higher as the weight for an attribute is higher, the priority sequence of the image adjustment processing for this attribute type becomes higher.

For the attribute type which was set in step S1101, if the similarity degree $X[i,k]$ between the attribute information of a specified image and the consistency information on the wall is the predetermined threshold or less (step S1102: YES), processing advances to step S1103. If the similarity degree $X[i,k]$ is larger than the predetermined threshold (step S1102: NO), processing advances to step S1104.

In step S1103, the control unit 101 performs the image adjustment processing for the attribute type that was set in step S1101. For example, as described in FIG. 10B, the image adjustment processing for composition is a processing to crop and magnify a part of the representative image so that the subject comes to the center. For each attribute type of the tinge, gradation and filter as well, the control unit 101 performs image adjustment processing respectively.

In step S1104, the control unit 101 determines whether the image adjustment processing was performed for each attribute type. If the image adjustment processing for each attribute type is completed (step S1104: YES), the image adjustment processing in FIG. 11 ends. If the image adjustment processing for each attribute type is not completed (step S1104: NO), processing returns to step S1101, and the processing is performed for the attribute type for which image adjustment processing was not yet performed.

By the end of the image adjustment processing in FIG. 11, the representative image generation processing in FIG. 6 ends, and the new album registration processing in FIG. 2 ends. The image adjustment processing may be performed on images other than the image specified to be used for the representative image. By performing the image adjustment processing on each image in the new album, the user can generate consistency with the wall even when the new album is opened.

Figure 12:
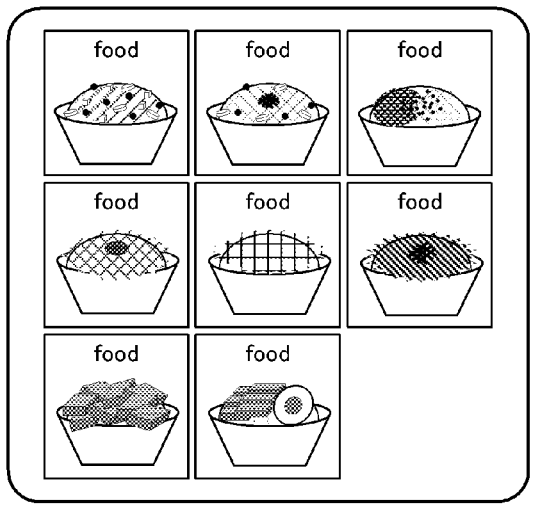
FIG. 12 is a diagram for describing an example of specifying representative images.
Figure 12:
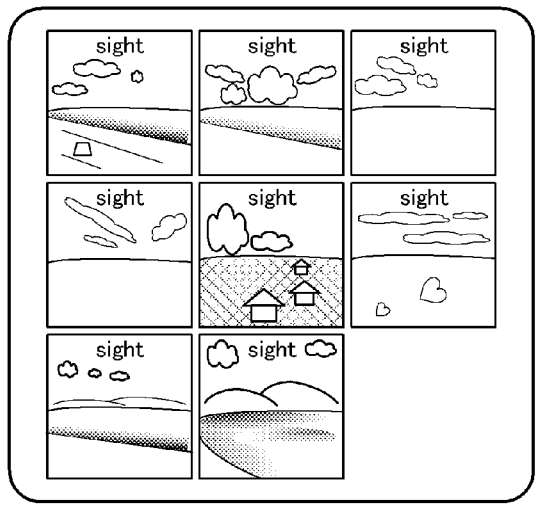
Figure 12:
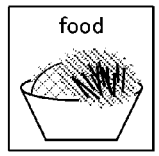
Figure 12:
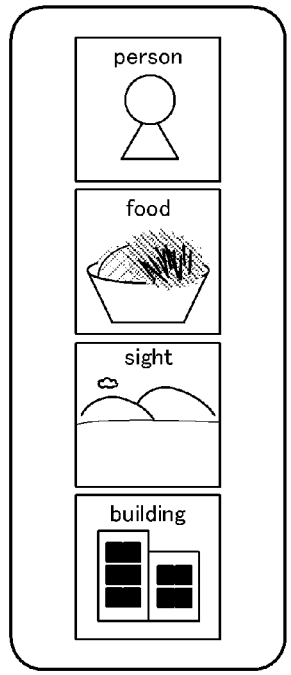
Figure 12:
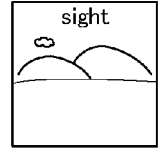

Specific Example of Representative Image Generation: A specific example of generating a representative image will be described with reference to FIG. 12. FIG. 12 is an example of adding a new album C to a wall A of which main subject is food and a wall B of which main subject is a sight. The new album C to be added includes four images of which main subjects are person, food, sight and building respectively. In the case of adding the new album C to the wall A, the control unit 101 specifies the image of the food as an image having consistency with the representative images of the existing albums. In the example in FIG. 12, the image of the food is directly used as the representative image. In the case of adding the new album C to the wall B, on the other hand, the control unit 101 specifies the image of the sight as an image having consistency with the representative images of the existing albums, and uses this image as the representative image.

According to the above mentioned Embodiment 1, the representative image of a new album is generated based on the consistency information on the wall, or the attribute information on the existing albums, as exemplified in FIG. 12, therefore the user can easily implement a wall having consistency.

In the above description, each image included in the new album to be added is a still image, but images included in the new album are not limited to still images. At least a part of the images included in the new album may be a moving image. In this case, the control unit 101 may specify a frame or a still image having the highest consistency score among each frame in the moving image and still images in the album, and generate a representative image thereby.

The wall constituted of the representative images of the existing albums is not limited to a wall on a smartphone (image processing apparatus 100) of the user. For example, the Embodiment 1 is applicable to a case where the user uploads (outputs) an album to an external server (external terminal) or the like, to share the album with others. In this case, the image processing apparatus 100 generates the representative image by acquiring the attribute information on each item or the consistency information on the wall from the representative images of the albums stored in the external server. The image processing apparatus 100 may upload the information on the generated representative image to the external server along with the new album.

In the above mentioned Embodiment 1, the control unit 101 performs the image adjustment processing on the representative image of the new album, but such processing as filter processing and tinge adjustment processing may be performed on all the images in the new album.

Embodiment 2

Embodiment 1 is an embodiment in the case where the consistency information on an attribute type, which was determined as having consistency for at least one attribute, can be acquired from each representative image of the existing albums included on the wall. Embodiment 2, on the other hand, is an embodiment in the case where no attribute type, which was determined as having consistency, can be acquired from each representative image of the existing albums included on the wall. In the case where the consistency information on the attribute type, which was determined as having consistency, cannot be acquired from the existing albums on the wall, the image processing apparatus 100 issues a warning to the user.

Among the new album registration processing steps according to Embodiment 2, the new album registration receiving (step S201) and representative image generation processing (step S203) are the same as Embodiment 1, hence description thereof is omitted. Among the new album registration processing steps according to Embodiment 2, the content of the consistency information acquisition processing is different from the processing in step S202 according to Embodiment 1. Here the consistency information acquisition processing according to Embodiment 2 will be described with reference to FIG. 13.

Figure 13:
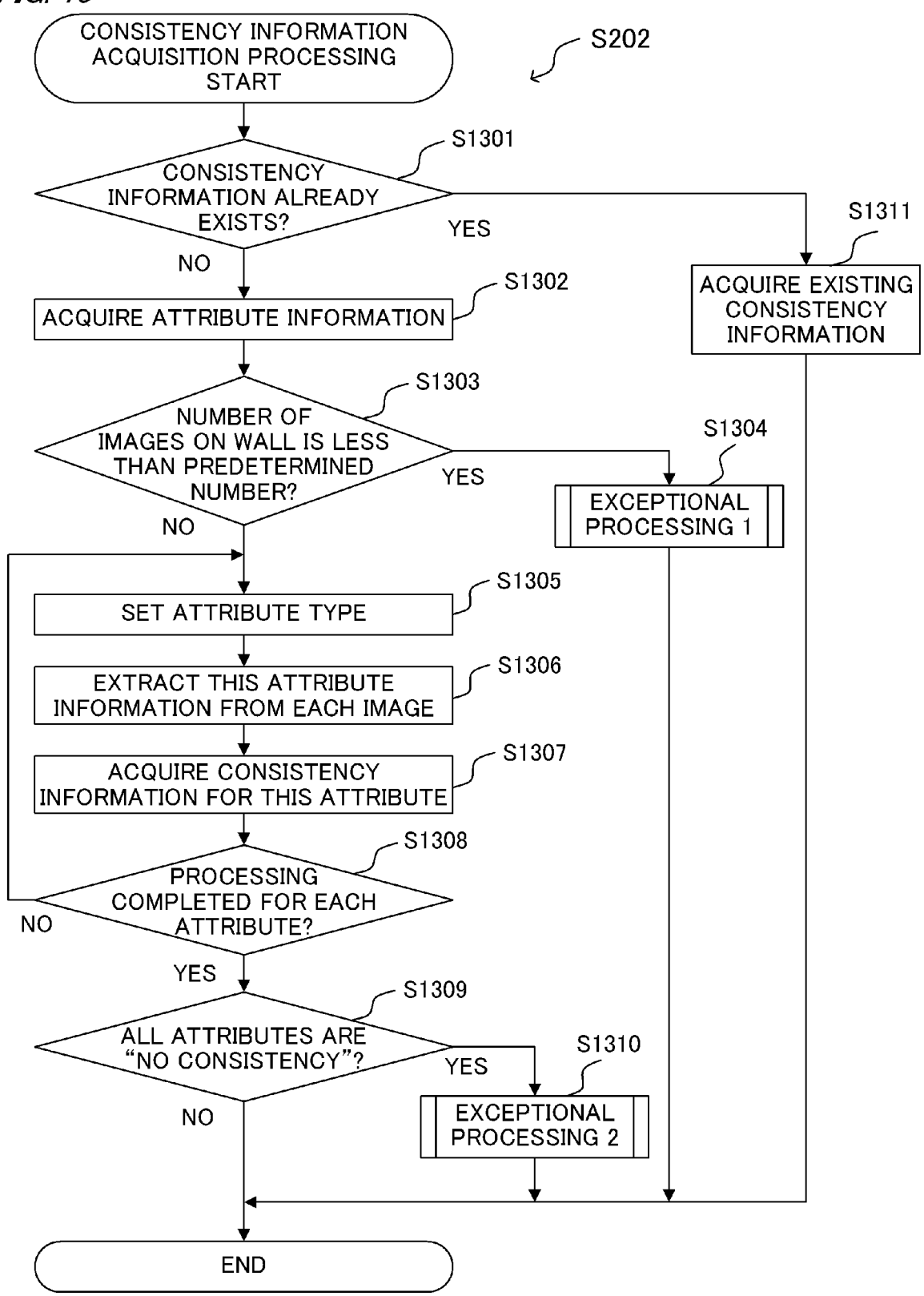
FIG. 13 is a flow chart exemplifying consistency information acquisition processing according to Embodiment 2.

Consistency Information Acquisition Processing of Embodiment 2: FIG. 13 is a flow chart exemplifying the consistency information acquisition processing according to Embodiment 2. In addition to the same processing as the consistency information acquisition processing according to Embodiment 1 in FIG. 4, the consistency information acquisition processing according to Embodiment 2 includes the exceptional processing 1 in steps S1303 and S1304, and the exceptional processing 2 in steps S1309 and S1310. The added exceptional processing 1 and exceptional processing 2 will be described.

Step S1301 and step S1311 are the same processing steps as step S401 and step S407 in FIG. 4 respectively. After acquiring the attribute information of the representative images on the wall in step S1302 in the same manner as step S402 in FIG. 4, the control unit 101 determines whether a number of images on the wall is less than a predetermined number in step S1303. A number of images on the wall is a number of (representative images of) the existing albums included on the wall. The predetermined number may be two, for example.

If the number of images on the wall is less than the predetermined number (step S1303: YES), processing advances to S1304. If the number of images on the wall is the predetermined number or more (step S1303: NO), processing advances to S1305. In step S1305 to step S1308, the control unit 101 executes the same processing as the processing from step S403 to step S406 in FIG. 4.

Since there are not a sufficient number of images on the wall to acquire the consistency information on the wall, the control unit 101 issues a warning to the user in step S1304, and executes the exceptional processing 1.

Figure 14:
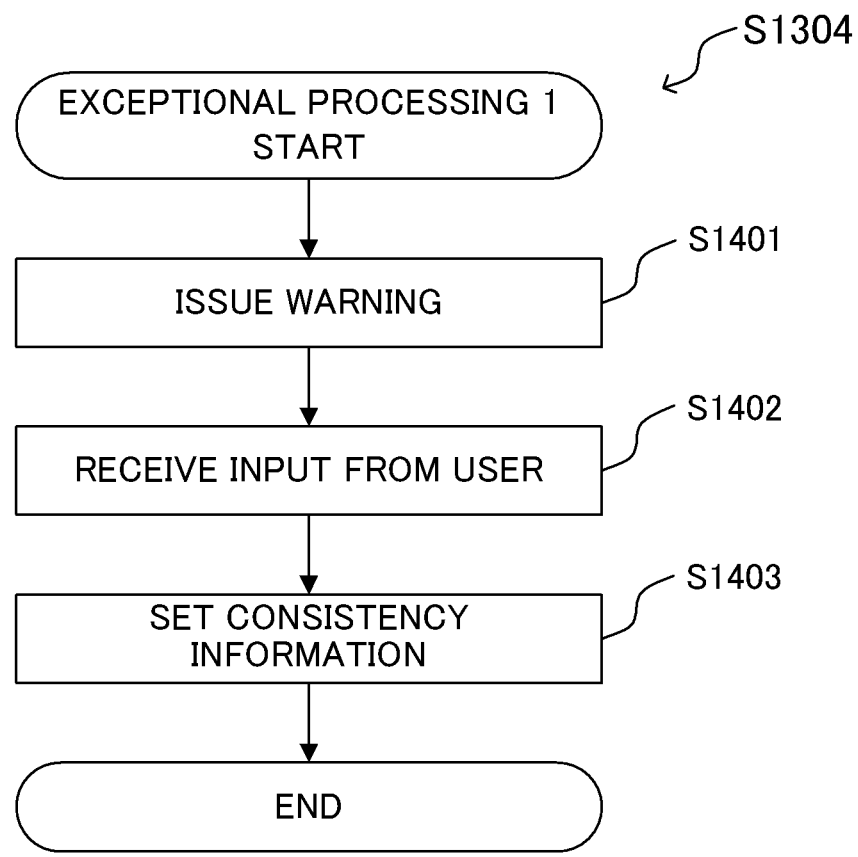
FIG. 14 is a flow chart exemplifying an exceptional processing 1.

Here the content of the exceptional processing 1 in step S1304 will be described with reference to FIG. 14. The exceptional processing 1 is a processing to set the consistency information on the wall based on the input from the user. FIG. 14 is a flow chart exemplifying the exceptional processing 1. In step S1401, the control unit 101 issues a warning to the user to notify that a number of images on the wall is small, and there are not a sufficient number of images to acquire the attribute information having consistency.

In step S1402, the control unit 101 receives input from the user on the consistency information on the wall. The content of the input that is received is information concerning the selection of the attribute type by which the user desires to unify the wall, such as the priority sequence of each attribute type to determine the consistency on the wall. The control unit 101 may receive the specification of the attribute on which the user assigns priority, via the interface indicated in FIG. 8, for example.

In step S1403, based on the input from the user in step S1402 and the images on the wall, the control unit 101 sets the consistency information on the wall for each attribute type as exemplified in FIG. 7. The images on the wall are representative images of the existing albums on the wall.

For example, in a case where the user selected the subject category on the screen in FIG. 8 to assign priority to unify the wall, the control unit 101 sets the subject category "food" of the images on the wall to the consistency information on the wall. The control unit 101 may set the weights of the other attribute types that are lower than this subject category, and then set the consistency information on the wall for the images on the wall. Further, the control unit 101 may set the other attribute types to "No consistency". When the control unit 101 sets the consistency information on the wall, the exceptional processing 1 in FIG. 14 ends.

The content of the input received from the user in step S1402 is not limited to the priority sequence of each attribute type to determine consistency. The control unit 101 may allow the user to input the consistency information on the wall for each attribute type.

If it is determined in step S1308 that the processing from step S1305 to step S1307 is completed for each attribute, processing advances to step S1309. In step S1309, the control unit 101 determines whether it was determined that all the attributes have "No consistency". If it was determined that all the attributes have "No consistency" (step S1309: YES), processing advances to step S1310. If it is determined that any one of the attributes has consistency (step S1309: NO), the consistency information acquisition processing in FIG. 13 ends.

Here the content of the exceptional processing 2 in step S1310 will be described with reference to FIG. 15. Step S1310 is a processing in a case where a sufficient number of images exist on the wall, but the level of consistency thereof is low, and it is determined that all the attributes have "No consistency".

Figure 15:
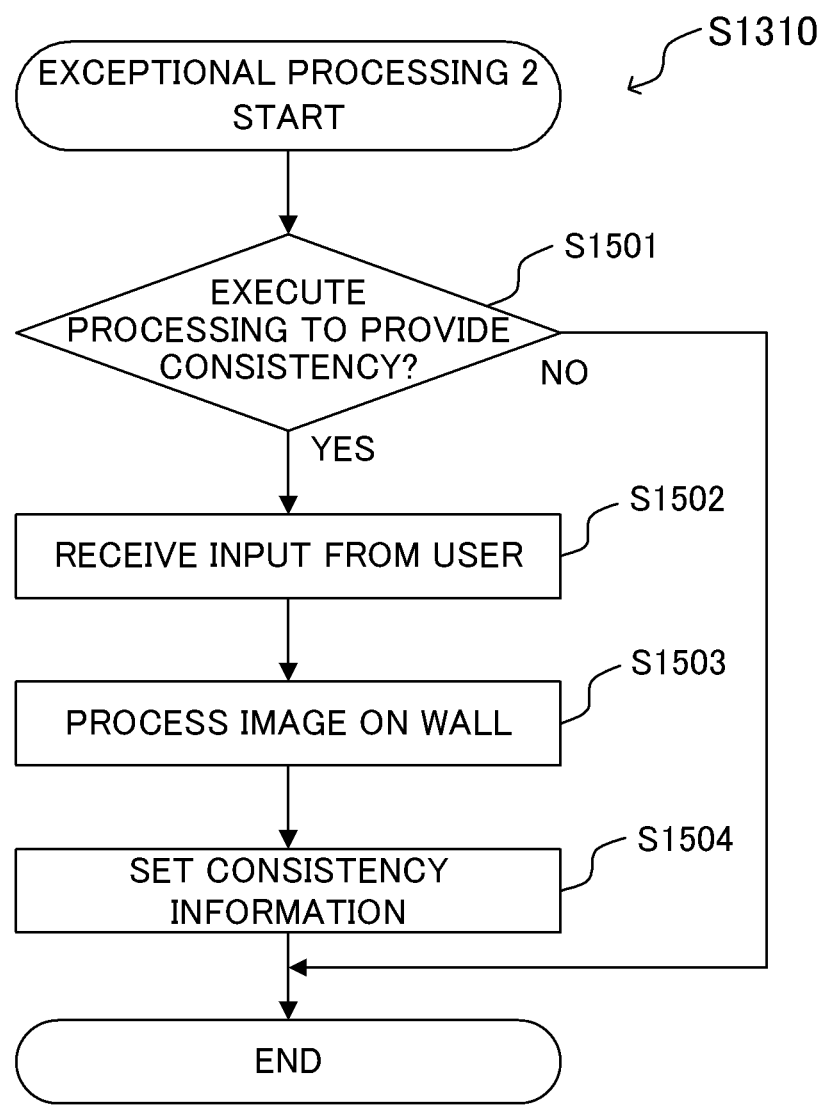
FIG. 15 is a flow chart exemplifying an exceptional processing 2.

FIG. 15 is a flow chart exemplifying the exceptional processing 2. In step S1501, the control unit 101 determines whether the processing to provide the consistency is executed or not. In a case where the level of consistency on the wall is low, it is possible that the user is unconcerned with the consistency on the wall. Therefore, whether the processing to provide the consistency is executed or not may be determined by an instruction received from the user. Further, whether the processing to provide the consistency is executed or not may be set in advance.

Figure 16:
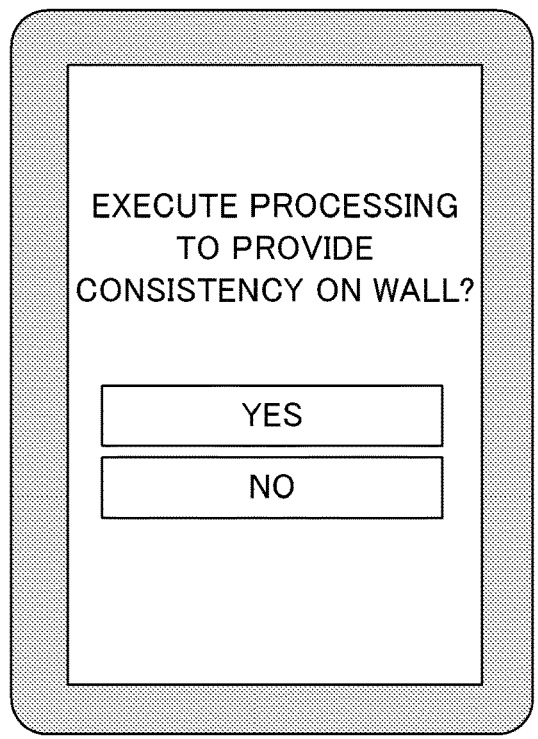
FIG. 16 is a diagram exemplifying an interface to instruct execution of processing to provide consistency.

Here an example of an interface, for the user to instruct whether the processing to provide the consistency on the wall is executed or not, will be described with reference to FIG. 16. FIG. 16 is a diagram exemplifying an interface to instruct execution of the processing to provide consistency. Specifically, the user can instruct whether the processing to provide consistency is executed or not by operating the "YES" or "NO" button, responding to the prompt "Execute processing to provide consistency on wall?"

If the user selects "YES", the control unit 101 determines that the processing to provide consistency on the wall is executed (step S1501: YES), and processing advances to step S1502. If the user selects "NO", the control unit 101 determines that the processing to provide consistency on the wall is not executed (step S1501: NO), and the exceptional processing 2 in FIG. 15 ends without executing the processing to provide consistency to the representative images.

In step S1502, the control unit 101 receives input from the user. The content of the input is information on the processing that is executed to provide consistency on the wall having low level of consistency. The processing to provide consistency, is, for example, processing performed on representative images of an album, so as to match with the attribute information on a representative image of a specific album on the wall, or predetermined processing performed on all the images on the wall.

Figure 17:
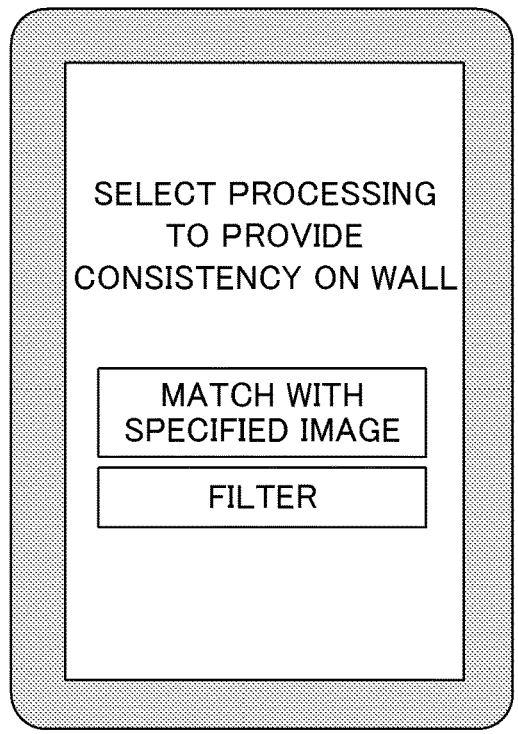
FIG. 17 is a diagram exemplifying an interface to instruct a method of providing consistency.

FIG. 17 is a diagram exemplifying an interface to instruct a method of providing consistency. In the example in FIG. 17, responding to the prompt "Select processing to provide consistency on wall", the user can instruct a method of providing consistency by operating a "Match with specific image" or "Filter" button. The control unit 101 executes the processing to provide consistency on the wall using the method selected by the user via the button. The method of providing consistency is not limited to the methods indicated in FIG. 17, and such methods as "display subject at center", "Unify size of subject" and "Unify tinge" may be included. The user may be permitted to instruct a plurality of methods.

In step S1503, images on the wall (respective representative images of existing albums on the wall) are processed based on the input from the user in step S1502. The images to be processed are not limited to the respective representative images of the existing albums on the wall, but may include images other than the representative images in the existing albums.

In the case of the example in FIG. 17, "Match with specific image" is selected, and if the user selects a specific image, the control unit 101 performs a processing, which matches with the tinge, gradation and filter of the specific image, on the images other than the specific image on the wall. If "Filter" is selected and the user selects a filter to be used, the control unit 101 performs the filter processing on the images on the wall using the filter selected by the user. The control unit 101 can acquire a wall having consistency by the processing in step S1503.

In step S1504, the control unit 101 sets the consistency information on the wall based on the input from the user in step S1502. Just like the consistency information acquisition processing in FIG. 4, the control unit 101 can acquire the attribute information from the wall having consistency generated in step S1503. Based on the consistency information on the wall, which was determined having consistency, the control unit 101 can specify an image having consistency from the new album.

According to the image processing apparatus 100 of Embodiment 2, the user can acquire a wall having consistency even if a number of images on the wall is small, or if the level of consistency on the wall is low.

Other Embodiments

In the present invention, the consistency may be evaluated using a neural network or the like based on learning, instead of an evaluation using a predetermined algorithm. In this case, a plurality of sets of wall images and a representative image, to which a flag indicating appropriate/inappropriate for this wall is attached (e.g. a set of "wall A" in FIG. 12, and "representative image" on right in FIG. 12), are provided as teaching data. Then these sets are learned by a neural network, whereby the consistency of the image with the images on the wall can be evaluated.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, consistency can be provided when a plurality of image groups are list-displayed using respective representative images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-107624, filed on Jun. 23, 2020, which is hereby incorporated by reference herein in its entirety.

What is claimed is:

1. An image processing apparatus comprising at least one memory and at least one processor which function as:
 a receiving unit configured to receive registration of a new image group for at least one existing image group; and
 a generation unit configured to specify an image having consistency with representative images, which are set for the existing image groups respectively, out of the images included in the new image group, and generate from the specified image a representative image of the new image group,
 wherein the specified image is specified so that consistency can be provided in a case where the representative images of existing image groups and the representative image of the new image group are list-displayed,
 wherein the generation unit is configured to extract attribute information from the representative images of the existing image groups, and specify an image having consistency with the representative images of the existing image groups, out of the images included in the new image group, based on comparison between the extracted attribute information and attribute information on each image included in the new image group, and
 wherein the generation unit is configured to specify an image having consistency with the representative images of the existing image groups, out of the images included in the new image group, based on a score which indicates the consistency calculated from a degree of similarity, for each attribute type, between the attribute information on each image included in the new image group and attribute information extracted from the representative images of the existing image groups.

2. The image processing apparatus according to claim 1, wherein
 the new image group is generated from a plurality of images selected by a user or a plurality of images automatically selected.

3. The image processing apparatus according to claim 1, wherein
 the attribute information to determine the consistency includes information on at least one of a subject type, composition, tinge, gradation and filter.

4. The image processing apparatus according to claim 3, wherein
 the attribute information on the composition is information on a size and position of the subject, the attribute information on the tinge is information on a specific main color of the image, the attribute information on the gradation is information on whether the image is an SDR image or an HDR image, and the attribute information on the filter is information on a filter used for image processing.

5. The image processing apparatus according to claim 1, wherein
 the generation unit is configured to generate a representative image of the new image group by adjusting the specified image, based on the attribute information on the representative images of the existing image groups, in order to provide a higher level of consistency with the representative images of the existing image groups.

6. The image processing apparatus according to claim 5, wherein
 the generation unit is configured to adjust images other than the specified image, based on the attribute information on the representative images of the existing image groups, in order to provide consistency with the representative images of the existing image groups to the images other than the specified image.

7. The image processing apparatus according to claim 1, wherein
 in a case where a number of existing image groups is less than a predetermined number, the generation unit is configured to receive selection of the attribute from a user, and specify an image having consistency with the representative images of the existing image groups, out of the images included in the new image group, based on the attribute information on the selected attribute and representative images of the existing image groups.

8. The image processing apparatus according to claim 7, wherein the at least one memory and the at least one processor further function as:
 a warning unit configured to issue a warning to the user in the case where a number of existing image groups is less than a predetermined number, or in the case where the representative images of the existing image groups have no consistency for any of the attributes.

9. The image processing apparatus according to claim 1, wherein the at least one memory and the at least one processor further function as:
 a processing unit configured to perform processing to provide consistency with the representative images of the existing image groups, based on an instruction from a user, in a case where the representative images of the existing image groups have no consistency for any of the attributes, and wherein the generation unit is configured to specify an image having consistency with the representative images of the existing image groups, out of the images included in the new image group, based on the attribute information on the representative images of the existing image groups after performing the processing to provide consistency.

10. The image processing apparatus according to claim 1, wherein in a case where the new image group includes a moving image, the generation unit is configured to specify an image having consistency with the representative images of the existing image groups, out of each frame of the moving image and still images included in the new image group.

11. The image processing apparatus according to claim 1, wherein in a case of outputting the new image group to an external terminal, the generation unit is configured to specify an image having consistency with the representative images of existing image groups stored in the external terminal, out of the images included in the new image group, and output the representative image of the new image group generated from the specified image to the external terminal, along with the new image group.

12. An image processing apparatus comprising at least one memory and at least one processor which function as:

a receiving unit configured to receive of a image group for at least one existing image group; and a generation unit configured to specify an image having consistency with representative images, which are set for the existing image groups respectively, out of the images included in the new image group, and generate from the specified image a representative image of the new image group, wherein the specified image is specified so that consistency can be provided in a case where the representative images of existing image groups and the representative image of the new image group are list-displayed, wherein the generation unit is configured to specify an image having consistency with the representative images of the existing image groups, out of the images included in the new image group, based on a score which indicates the consistency calculated from a degree of similarity, for each attribute type, between attribute information on each image included in the new image group and consistency information on the representative images of the existing image groups.

13. The image processing apparatus according to claim 12, wherein the generation unit is configured to calculate the score indicating the consistency, by weighting the degree of similarity for each attribute type to determine the consistency.

14. An image processing method comprising a receiving step of receiving registration of a new image group for at least one existing image group, and a generation step of specifying an image having consistency with representative images, which are set for the existing image groups respectively, out of the images included in the new image group, and generating from the specified image a representative image of the new image group, wherein the specified image is specified so that consistency can be provided in a case where the representative images of existing image groups and the representative image of the new image group are list-displayed, wherein, in the generation step, attribute information is extracted from the representative images of the existing image groups, and an image having consistency with the representative images of the existing image groups is specified out of the images included in the new image group, based on comparison between the extracted attribute information and attribute information on each image included in the new image group, and wherein, in the generation step, an image having consistency with the representative images of the existing image groups is specified out of the images included in the new image group, based on a score which indicates the consistency calculated from a degree of similarity, for each attribute type, between the attribute information on each image included in the new image group and attribute information extracted from the representative images of the existing image groups.

15. A non-transitory computer-readable medium that stores a program for causing a computer to execute:

a receiving step of receiving registration of a new image group for at least one existing image group, and a generation step of specifying an image having consistency with representative images, which are set for the existing image groups respectively, out of the images included in the new image group, and generating from the specified image a representative image of the new image group, wherein the specified image is specified so that consistency can be provided in a case where the representative images of existing image groups and the representative image of the new image group are list-displayed, wherein, in the generation step, attribute information is extracted from the representative images of the existing image groups, and an image having consistency with the representative images of the existing image groups is specified out of the images included in the new image group, based on comparison between the extracted attribute information and attribute information on each image included in the new image group, and wherein, in the generation step, an image having consistency with the representative images of the existing image groups is specified out of the images included in the new image group, based on a score which indicates the consistency calculated from a degree of similarity, for each attribute type, between the attribute information on each image included in the new image group and attribute information extracted from the representative images of the existing image groups.

* * * * *